United States Patent
Victory et al.

(10) Patent No.: US 8,204,721 B2
(45) Date of Patent: Jun. 19, 2012

(54) APPARATUS AND METHOD FOR EMULATION OF PROCESS VARIATION INDUCED IN SPLIT PROCESS SEMICONDUCTOR WAFERS

(75) Inventors: James Victory, Mettembert (CH); Juan D. Cordovez, Corona Del Mar, CA (US)

(73) Assignee: Sentinel IC Technologies, Inc., Newport Beach, CA (US)

( * ) Notice: Subject to any disclaimer, the term of this patent is extended or adjusted under 35 U.S.C. 154(b) by 222 days.

(21) Appl. No.: 12/825,269

(22) Filed: Jun. 28, 2010

(65) Prior Publication Data
US 2010/0332208 A1     Dec. 30, 2010

Related U.S. Application Data

(60) Provisional application No. 61/269,846, filed on Jun. 29, 2009.

(51) Int. Cl.
*G06F 17/50*     (2006.01)
(52) U.S. Cl. .............. 703/2; 703/13; 700/109; 700/121; 702/84
(58) Field of Classification Search ............... 703/2, 13; 700/109, 121; 205/84; 702/84
See application file for complete search history.

(56) References Cited

U.S. PATENT DOCUMENTS

| | | | |
|---|---|---|---|
| 6,428,673 B1 * | 8/2002 | Ritzdorf et al. | 205/84 |
| 7,580,768 B2 * | 8/2009 | Muenz | 700/109 |
| 7,974,728 B2 * | 7/2011 | Lin et al. | 700/121 |
| 2003/0066752 A1 * | 4/2003 | Ritzdorf et al. | 205/82 |
| 2005/0107971 A1 * | 5/2005 | Ritzdorf et al. | 702/84 |
| 2006/0265098 A1 * | 11/2006 | Gould et al. | 700/121 |
| 2008/0077256 A1 * | 3/2008 | Muenz | 700/30 |
| 2008/0275585 A1 * | 11/2008 | Lin et al. | 700/109 |
| 2008/0294282 A1 * | 11/2008 | Koshti et al. | 700/121 |

OTHER PUBLICATIONS

Joseph Sloan, et al; A Numerical Optimization-based Methodology for Application Robustification; Jul. 2010; International Conference on Dependable Systems and Networks, DSN.
Gabriel Olten; Fuzzy Techniques in Analog Circuit Design; May 2008; Bases of Electronics Dept.; Technical University of Cluj-Napoca.
Cadence Analog/Mixed-Signal Design Methodology; 2009; Cadence Design Systems, Inc.

(Continued)

*Primary Examiner* — Thai Phan
(74) *Attorney, Agent, or Firm* — WHGC, PLC; John F. O'Rourke; Erick P. Wolf

(57) ABSTRACT

Predictive Split Lot Emulator, and methods simulating integrated circuit performance variations, before IC fabrication. The emulator receives a split lot parameter, maps the split lot parameter onto an IC element model, and transforms the IC element into a predictive IC element model. The emulator uses the predictive model to determine simulated performance characteristic of the IC element model. Also, a predictive split lot analyzer, a CAD simulation system, and a PDK including the emulator. IC simulating methods include choosing a Split Condition from a Split Table; a Predictive Split Lot Emulator receiving the Condition, determining a Split Parameter Condition Perturbation, mapping the Perturbation into a Model Parameter Perturbation for an IC element, and storing the Model Perturbation for an IC element into a Model Parameter Perturbation Library. The Perturbation Library emulates IC element performance characteristic in a Split Condition. Determining, mapping, and emulating are executed prior to integrated circuit fabrication.

10 Claims, 6 Drawing Sheets

OTHER PUBLICATIONS

Abhishek Jajoo; A Wide-Band Low Noise Amplifier Synthesis Methodology; Aug. 2005; thesis for Master in Science; Caregie Mellon University; Pittsburgh PA.

Comparision of Measured and Simulated Values of Rdson (ohms).

Margaret L. Kniffin, et al.; Physical Compact Modeling of Layout Dependent Metal Resistance in Integrated LDMOS Power Devices.

Y. Chen, et al.; Modeling and Analysis of Metal Interconnect Resistance of Power IC's; 2007; School of Electrical Engineering and Computer Science, University of Florida.

James Victory; A Physically-Based Compact Model for LDMOS Transistors; Motorola, Inc.

* cited by examiner

FIG. 2

Table 200 — Split Parameters (SP) / Split Parameter Levels (N)

| | Gate Oxide Thickness TOX | | | Poly Silicon Critical Dimension | | | Active Area Critical Dimension CD_AA | | | N-type Implant MOSFET Doping $N_{NFET}$ | | | P-type Implant MOSFET Doping $N_{PFET}$ | | | Poly Silicon Doping | | |
|---|---|---|---|---|---|---|---|---|---|---|---|---|---|---|---|---|---|---|
| | H | N | L | H | N | L | H | N | L | H | N | L | H | N | L | H | N | L |
| Split 1 | | x | | | x | | | x | | | x | | | x | | | x | |
| Split 2 | | | x | | | x | | | x | | | x | | | x | | | x |
| Split 3 | x | | | x | | | x | | | x | | | x | | | x | | |
| Split 4 | | | x | | x | | | | x | | x | | | | x | | x | |
| Split 5 | x | | | | | x | x | | | | | x | x | | | | | x |

(Labels: 210 = Split rows; 225 = Split Parameters header; 230 = parameter name; 235, 240, 245 = level labels H/N/L; 250 = data cell)

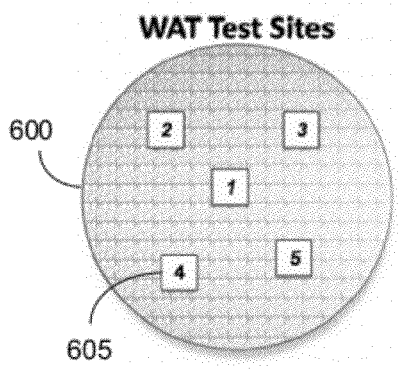

Nominal Model Verification: ΔSP=0 (630)

| | IDSATN W=10e-6 L=0.18e-6 | IDSATP W=10e-6 L=0.18e-6 | VTN W=10e-6 L=0.18e-6 | VTP W=10e-6 L=0.18e-6 | Poly-Silicon Sheet Resistance |
|---|---|---|---|---|---|
| Nominal Split | 6.1 | -2.40 | 0.36 | -0.38 | 270 |
| Nominal Model Simulation | 6.11 | -2.405 | 0.361 | -0.379 | 270 |
| Error in % | 0.16 | -0.21 | 0.28 | -0.26 | 0.00 |

Split X Verification: ΔSP set to Split X Values (650)

| | IDSATN W=10e-6 L=0.18e-6 | IDSATP W=10e-6 L=0.18e-6 | VTN W=10e-6 L=0.18e-6 | VTP W=10e-6 L=0.18e-6 | Poly-Silicon Sheet resistance |
|---|---|---|---|---|---|
| WAT 1 | 6.51 | -2.7 | 0.321 | -0.33 | 300 |
| WAT 2 | 6.5 | -2.71 | 0.322 | -0.32 | 298 |
| WAT 3 | 6.49 | -2.69 | 0.32 | -0.33 | 302 |
| WAT 4 | 6.5 | -2.71 | 0.321 | -0.33 | 303 |
| WAT 5 | 6.52 | -2.7 | 0.321 | -0.33 | 299 |
| WAT Average | 6.504 | -2.702 | 0.321 | -0.325 | 300.4 |
| VirtualLOT Simulated Split X | 6.51 | -2.71 | 0.322 | -0.33 | 300 |
| Error in % | 0.09 | -0.30 | 0.31 | -0.31 | 0.13 |

FIG. 6

APPARATUS AND METHOD FOR EMULATION OF PROCESS VARIATION INDUCED IN SPLIT PROCESS SEMICONDUCTOR WAFERS

CROSS-REFERENCE TO RELATED ISSUED PATENTS AND APPLICATIONS

The present application is related to, and claims priority benefit of U.S. Provisional Patent Application No. 61/269,846, entitled "Algorithmic Device and Circuit Simulation Methodology to Emulate Process Variation Induced in Semiconductor Wafers Manufactured Under Split Process Recipe Conditions", which was filed on Jun. 29, 2009 by the inventors hereof, and which is incorporated by reference herein in its entirety.

BACKGROUND

1. Field of the Invention

The present invention generally pertains to semiconductor wafer fabrication and, in particular, methods and apparatus for predicting fabrication process variations.

2. Related Art

Successful IC (integrated circuit) development results in an IC, or "chip", that reaches mass production in a semiconductor manufacturing factory often referred to as a "fab". ICs are the building blocks of modern day electronics ranging from consumer, commercial, industrial, and aerospace and defense applications. In order to reach production from IC conception, an IC designer follows a sequence of design steps performed in a computer aided design or CAD environment through specialized software referred to as a process design kit or PDK. The IC is then physically fabricated following a predefined set of fab manufacturing recipes, construction flows, and process conditions. The fabricated IC is then measured and tested in an electronics laboratory for accuracy and robustness to the design specifications. If the IC does not meet design specifications, the IC typically enters a re-design phase and the fabrication process is repeated. If the fabricated IC meets design specifications, the product qualification phase is entered. In general, product qualification is the process of demonstrating that an entity is capable of meeting or exceeding the specified requirements, including, without limitation, performance characteristic, quality, reliability, or environmental requirements.

A significant component of product qualification is investigation of IC functionality, and robustness to design specifications, over semiconductor process variation. Variations in semiconductor manufacturing process technology are unavoidable due to variations in manufacturing equipment and environment control tolerances. Process variation can be manifested in variations of both device and interconnect electrical performance. As ICs are composed of various devices electrically wired together through interconnect, the IC designers must ensure the IC will operate and yield to design specifications at the extremes of semiconductor process variation. To achieve this end, the IC is fabricated through Split Lots also referred to as "Corner Lots," which introduce specific process variations through semiconductor process recipe changes. The motivation for Split Lots is to provide the IC designer with IC performance characteristic metrics across process variation extremes without having to mass fabricate a large amount of wafers over an extended time period to obtain the process variation from statistics in a manual fashion.

A split lot is typically composed of plural split condition wafers. A Split Condition is a fabrication process recipe that produces the desired process parameter perturbations. A Split Condition wafer is created by perturbing the physical process parameters through fabrication recipe changes. There may be hundreds (or more) of physical process parameters from which the conditions for a given split lot may be selected. IC designers are forced to choose which Split Conditions are expected to incur the most sensitivity of the IC performance characteristic to design specifications. Once the Split Conditions are chosen, silicon wafers containing the IC are fabricated for each Split Condition. As each Split Condition typically corresponds to minimum of 2 fabricated silicon wafers, the number of Split Conditions fabricated into wafers is limited in practice. A typical Split Lot will be formed by grouping 24-48 wafers corresponding from 12-24 Split Condition wafers. After fabrication, IC devices from the Split Lot are measured and tested for robustness and yield, in accordance with IC design specifications.

Each split and, indeed, a split lot, may provide a wealth of data pertaining to correlations between parametric value perturbations and product yields. In practice, the effectiveness of the Split Conditions is based on the expertise level of the IC designer and related experience with the particular IC design applications and subsequent sensitivities to process variation. During split lot fabrication, unintended variations in, for example, temperatures, pressures, doping or metal distribution, may accompany an intended device parameter perturbation. If the process parameters that are perturbed generate inconclusive, confounding, or uninformative data, an additional split lot run may be required, this time using different perturbed parameters or re-evaluating prior parameter perturbations. Given that many Split Conditions are not actually fabricated and investigated for IC compliance to design specifications, the Split Lot process is often rendered an incomplete and inadequate method to ensure IC compliance to process variation. Furthermore, the Split Lot process is a costly in terms of time and money spent on engineering resources and wafer fabrication. The additional time to complete the Split Lot process ultimately delays production ramp which can lead to loss of market opportunity.

SUMMARY

The present invention solves the above-mentioned shortcomings by providing apparatus for integrated circuit emulation, and methods of simulating integrated circuit performance variations, prior to integrated circuit fabrication.

An apparatus embodiment for integrated circuit simulation includes a predictive split lot emulator configured to receive a selected split lot parameter. The predictive split lot emulator embodiment also is configured to map the selected split lot parameter onto a selected IC element model. The predictive split lot emulator embodiment transforms the selected IC device model is transformed into a predictive selected IC element model. The predictive split lot emulator embodiment uses the predictive selected IC element model to make determinable a simulated performance characteristic of the selected IC element model. Alternatively, the predictive split lot emulator embodiment is a constituent of a process development kit. In another apparatus embodiment, the simulated performance characteristic of the selected IC element model also is determinable before physical fabrication of the selected IC element.

In still another apparatus embodiment, a predictive split lot analyzer includes the predictive split lot emulator, and is configured to receive a measured performance characteristic from a metrology system. The measured performance characteristic corresponds to the simulated performance characteristic. The predictive split lot analyzer is configured to determine a difference between the measured performance characteristic and the simulated performance characteristic, and to transmit the difference to the predictive split lot emulator. The predictive split lot emulator receives the difference and modifies the selected IC element model for reducing the difference. Alternatively, the apparatus is a process development kit including the predictive split lot analyzer.

In yet another embodiment, the apparatus also includes a computer aided design simulation system that has the predictive split lot emulator therein. The computer aided design simulation system is configured to design the selected IC element in response to a difference between a measured performance and a simulated performance characteristic. In still a further embodiment, the apparatus further includes a computer system having a memory, a graphical user interface, and an interface coupled to the Internet. In addition the computer system includes therein the predictive split lot emulator. In yet another alternative embodiment, the apparatus is a process development kit including the computer having the predictive split lot emulator.

In yet a further apparatus embodiment, the apparatus having the predictive split lot emulator as a constituent of the predictive split lot analyzer includes a computer system, a computer aided design simulation system programmed on the computer system, and a process development kit including the computer aided design simulation system therein. The computer system has a memory, a graphical user interface, and an interface to the computer system coupled to a computer network. The computer aided design simulation system includes the predictive split lot analyzer. The computer aided design simulation system is configured to design the selected IC element in response to an difference between a measured performance characteristic and a simulated performance characteristic. Alternatively, the interface is coupled between the World Wide Web and to the process development kit.

In still a further additional embodiment, a predictive split lot analyzer including the predictive split lot emulator therein is configured to make determinable the simulated performance characteristic of the selected IC element model before physical fabrication of the selected IC element. The predictive split lot analyzer is coupled to a computer system having a memory, a graphical user interface, and an interface to the computer system coupled to a computer network. The computer aided design simulation system is programmed on the computer system and includes the predictive split lot analyzer. The predictive split lot analyzer is configured to receive a measured performance characteristic from a metrology system. The computer aided design simulation system is configured to design the selected IC element in response to an difference between a measured performance characteristic and a simulated performance characteristic, with the measured performance corresponding to the simulated performance characteristic. The interface the computer system coupled to a computer network is coupled between the World Wide Web and the computer aided design simulation system.

An method embodiment of simulating integrated circuit performance variations includes choosing a selected Split Condition from a Split Table; receiving the selected Split Condition by a Predictive split lot Emulator; determining a selected Split Parameter Condition Perturbation from the selected Split Condition by the Predictive split lot Emulator; and mapping the selected Split Parameter Condition Perturbation into a selected Model Parameter Perturbation corresponding to a selected IC element. The acts of determining the selected Split Parameter Condition Perturbation mapping the selected Split Parameter Condition Perturbation are executed prior to integrated circuit fabrication. Also, the embodiment includes storing the selected Model Parameter Perturbation into a Model Parameter Perturbation Library corresponding to the selected IC element. The selected Model Parameter Perturbations Library emulates a selected IC element performance characteristic, corresponding to the selected Split Condition.

In another embodiment, the foregoing method embodiment is augmented by storing the selected Model Parameter Perturbation Library in a storage memory of a programmed computer; loading the selected Model Parameter Perturbation Library from the storage memory into a Predictive Split Lot Analyzer in the programmed computer; selecting the selected Model Parameter Perturbation from the selected Model Parameter Perturbation Library; simulating a performance of the IC selected element using the selected Model Parameter Perturbation in a computer aided design simulator (CADS), from the selected Model Parameter Perturbation Library, wherein the simulating produces simulation results corresponding to the performance of the IC selected element with respect to the selected Split Condition; and determining from simulation results if the selected IC element meets a predetermined metric for the selected Split Condition. If the selected IC element does not meet the predetermined metric, then modifying a designed portion of the selected IC element is executed, with the method resuming at the aforementioned action of simulating. However, if the selected IC element does meet the predetermined metric, then the method embodiments include determining if an additional selected Model Parameter Perturbation is to be simulated for the selected IC element, and if so, and then selecting the additional selected Model Parameter Perturbation from the selected Model Parameter Perturbation Library and resuming the method with the aforementioned action of simulating, using the additional selected Model Parameter Perturbation.

In still another method embodiment, the method includes the actions of determining a simulation result with the predictive split lot emulator; fabricating at least one IC wafer having a selected IC element thereon; measuring a Wafer Acceptance Test parameter on the at least one IC wafer corresponding to the simulation result; and comparing the simulation result to the Wafer Acceptance Test parameter by which accuracy of the predictive split lot emulator is verified.

In yet another method embodiment, the aforementioned "immediately preceding method embodiment" includes selecting plural selected Model Parameter Perturbations from the selected Model Parameter Perturbation Library for simulation of corresponding performances of the selected IC element; and simulating two or more of the plural selected Model Parameter Perturbations in parallel in a computer aided design simulator.

Alternatively, the aforementioned "immediately preceding method embodiment" includes providing the Split Table by a fabrication facility, wherein the Split Table stores at least one selected split parameter perturbation. In another alternative embodiment, the selected IC element is one of a device or an interconnect. In yet another alternative method embodiment the Predictive split lot Analyzer is a constituent of a computer aided design simulator. In still another alternative method embodiment, the predetermined metric is one of a predetermined performance requirement or a predetermined specification or a predetermined figure-of-merit for the selected IC element. In yet a further alternative method embodiment, the Predictive split lot Analyzer is a constituent of a process development kit design environment, and an additional method action includes inputting the selected Model Parameter Perturbation Library into the process development kit design environment.

In another method embodiment, the act of simulating is within the process development kit design environment and the process development kit design environment is a constituent of the computer aided design simulator.

BRIEF DESCRIPTION OF THE DRAWINGS

The invention is generally shown by way of reference to the accompanying drawings in which:

FIG. 2 is an illustration of a split parameter table, in accordance with the teachings of the present invention;

FIG. 6 is a graphical illustration of verification testing of predictive split lot analysis, in accordance with the teachings of the present invention.

DESCRIPTION OF THE EMBODIMENTS

Figure 1:
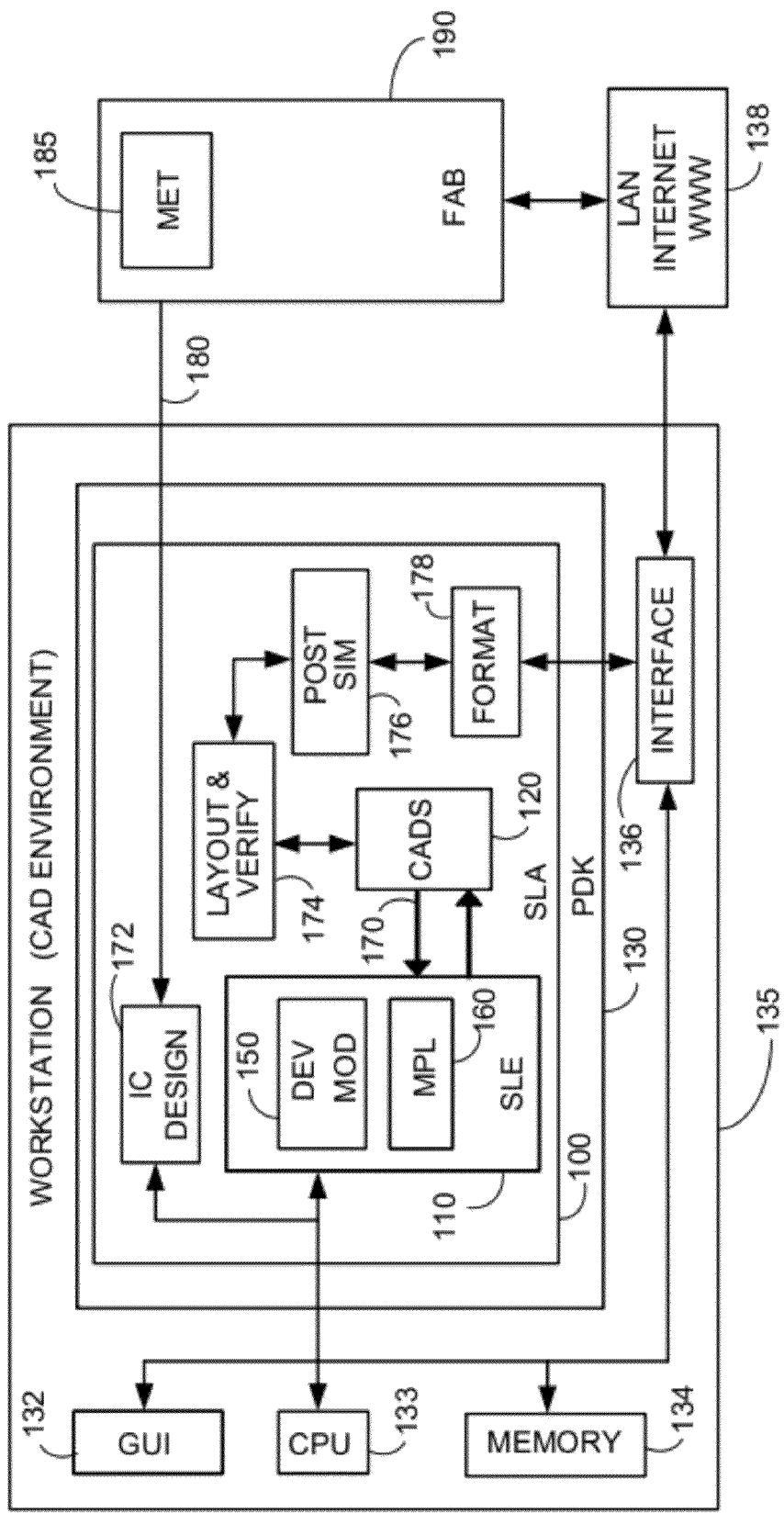
FIG. 1 is a block diagram of predictive split lot analyzer system, including a predictive split lot emulator embodiment therein, in accordance with the teachings of the present invention.

Some embodiments are described in detail with reference to the related drawings. Additional embodiments, features and/or advantages will become apparent from the ensuing description or may be learned by practicing the invention. In the figures, which are not drawn to scale, like numerals refer to like features throughout the description. The following description is not to be taken in a limiting sense, but is made merely for the purpose of describing the general principles of the invention.

Embodiments of the present invention provide at least one device model, a model parameter library, or both, which may be used in conjunction with a CAD simulator to accurately simulate the IC electrical performance characteristic of an IC element across process variation. Unlike present split lot data which is determined empirically, that is, after fabrication and metrology of a split lot, present embodiments can implement predictive modeling, in which IC electrical performance characteristic can be accurately established, before an IC element is fabricated, through Split Lot emulation. An IC element may be an IC device or an IC interconnect. A selected IC device can be an element, built in a semiconductor process through a combination of process steps and layers that produces a known or desired behavior upon stimulus in an IC element. Typically, a cooperative collection of IC elements form a circuit. One or more circuits may cooperate to define a functional IC unit on a die. A physical semiconductor wafer may have dozens, hundreds, or thousands of functional units formed thereon.

Selected embodiments of the present invention provide methods for Split Lot emulation; other embodiments provide an emulation apparatus, or simply, an emulator. In embodiments according to the present teachings, an IC designer may emulate the Split Lot process in a pure computer aided design (CAD) simulation environment to ultimately improve the effectiveness of the Split Lot process. The Split Conditions are virtually fabricated through CAD simulation, so that the IC device performance characteristic to design specifications can be investigated at the Split Conditions, prior to the first IC fabrication step. Robust, high yield IC design typically involves a CAD circuit simulation environment that accurately represents the semiconductor processes across an entire semiconductor process variation space. The CAD circuit simulation environment may allow designers to ensure an IC will operate and yield even at the extremes of semiconductor process variation.

As used herein a device model is a set of mathematical equations derived in a compact form that describe the electrical, electromagnetic and thermal behavior of a device. Typically, device model equations are configured to be used in a selected CAD circuit simulation environment. In general, each device corresponding to a semiconductor process has a corresponding native device model which describes the respective device behavior. Device behavior can be characterized by model parameters corresponding to the native device model equations, and pertaining to the corresponding device or a semiconductor process being used to fabricate the device. Each native device model typically is configured with respect to a selected fabrication process, and may be implemented in a simulator tool, which can be a constituent of a semiconductor technology circuit simulation and design environment. Also, a model parameter library can be a substantially complete set of model parameters for the device models specified in a selected semiconductor process. A Model Parameter Library is typically embedded in an ASCII text file.

Turning to FIG. 1, an example embodiment of a Split Lot Analyzer system (SLA) 100, which can include Split Lot Emulator (SLE) 110 and CAD circuit simulation environment (CADS) 120. SLA 100 may be a constituent of Process Development Kit (PDK) 130. PDK 130 may be software, or a combination of hardware and software. Embodiments of SLA 100 can be disposed, and configured to operate, on a CAD computer system or workstation 135, which can include user interface 132 and memory 134. In an alternative embodiment, SLE 110 may be disposed and configured to operate on workstation 135, which may be a computer separate from, and in communication with, a computer configured to operate CADS 120. Also, SLE 110 can be a distinct entity in cooperative communication with PDK 130. Memory 134 may symbolize one or more storage elements, including a volatile storage element or a non-volatile storage element. Memory 134 may not be constrained to workstation 135, but may be distributed over a computer network. Workstation 135 also can include an interface 136 to a network 138, such as a LAN, the Internet or the World Wide Web 142. Workstation 135 may include a high-performance CPU 133, SMP, or n-way ASMP, which can be configured to perform predictive split lot emulator operations in parallel, or substantially simultaneously. Such systems are well-known in the art. Workstation or computer system 135 may perform split lot emulation or split lot analysis alone, or in cooperative communication using interface 136 with plural workstations or a computer network, including the Internet. Internet access can be effected through, for example, the World Wide Web (WWW), one or more other Internet protocols, or a combination of the WWW and one or more other Internet protocols.

One or more native device models may be provided by fabrication facility 190, and be stored in memory 134. Alternatively, native device models may be entered into memory 134 by a design engineer. Also, one or more Split Condition parameter tables, having at least one Split Condition parameter, and corresponding to the one or more native device models, may be provided by fabrication facility 190. In general, the portion of native device model, or model parameter library, or both, processed through CADS 120 to simulate the statistics of the process variation is often referred to as "statistical models." At least a portion of DEVMOD 150 can be a statistical model, having characteristic statistical model parameters, and also being representative of a physical device, or interconnect, being modeled. Typically, statistical model parameters for a respective statistical model can be representative of a selected semiconductor process. SLE 110 can map at least one Split Condition parameter to, either directly or indirectly through mapping equations, to produce predictive DEVMOD 150, predictive MPL 160, or both. Using GUI interface 132, an IC designer can input from memory 134, one or more native device models, DEVMOD 150 or a MPL 160 into SLE 110 and, in turn, into CADS 120. Alternatively, CADS 120 may be coupled to provide feedback 170 from CADS 120 in response to DEVMOD model 150 or MPL 160.

Using feedback 170, SLE 110 may iteratively refine DEVMOD 150, or at least a portion of MPL 160. Feedback 170 may be provided from a metrology system at a fabricating facility, or third party tester. Device models (e.g., DEVMOD 150) and model parameter libraries (e.g., MPL 160) that contain information on variation of a selected fabrication process or recipe can be included as part of a Process Development Kit (e.g., PDK 130). Also, an IC designer may access DEVMOD 150 through CADS 120 to simulate the IC over a selected process variation. An example of a suitable CADS 120 can be one of the SPICE families of CAD circuit simulators. CADS 120 may be constituent of an integrated computer aided design environment, which may include IC design module 172, layout & verification module 174, post-layout simulation module 176, and formatting module 178. Alternatively, CADS 120 may incorporate therein one or more of IC design module 172, layout & verification module 174, post-layout simulation module 176, and formatting module 178. Of course, many other configurations are possible. Thus, accuracy of the IC simulation (e.g., feedback 170) compared to measured data 180 from post-fabrication metrology 185 in fabrication facility 190 can directly correlate to the accuracy of the device models and model parameter libraries.

As can be seen, embodiments of the present invention including SLE 110 can enable an IC designer to convert the Split Lot Process from a pure manufacturing step to a pure CAD simulation step, drastically reducing time and cost to reach IC production. In addition, SLA 100 can reduce constraints on the number of Split Conditions to investigate through the virtual fabrication of the Split Condition wafers in a CAD simulation environment. SLE 110 can provide IC designers an efficient, comprehensive, and low cost apparatus or method to determine the IC performance sensitivities to the Split Parameters and Conditions. Subsequently, the designer can choose the Split Conditions to actually fabricate into silicon wafers based on simulated IC sensitivities, maximizing the effectiveness of the Split Lot process. In some embodiments, SLA 100, or SLE 110 may be used to design the actual IC element to be fabricated. In others, SLA 100 or SLE 110 may be used as an element of a computer-aided design environment, which may perform early process development and simulations, in which split lot simulations provide feedback useful to change a portion of a process, a portion of an IC element model, or a portion of a physical IC element. Of course, SLE 110 can be configured to operate with numerous implementations of CADS 120, or workstation 135 so that SLA 100 can be implemented on a wide variety of computer platforms.

FIG. 2 illustrates a Split Condition parameter table 200 from which a Split Condition parameter (represented by parameter 210) may be mapped to a corresponding statistical model parameter, for example, by SLE 110. A Split Condition generally is a selected combination of fabrication process parameter perturbations. Embodiments herein may apply to any device in a semiconductor process that may be influenced by a split parameter to cause a perturbation in one or more mechanism of an IC element. An example of a mechanism of an IC element can include, without limitation, a physical mechanism, an electrical mechanism, an electromagnetic mechanism, a chemical mechanism, a thermal mechanism, or an electrothermal mechanism. Devices in a semiconductor process may include, without limitation, a Field Effect Transistor (FET), a bipolar junction transistor (BJT), a heterojunction bipolar transistor (HBT), or another devices which can be described in terms of model equations and model parameters. A FET may include, without limitation, a MOSFET, a JFET, a Multi-Gate FET, or a FINFET. An HBT may include, without limitation, a SiGe HBT, a GaAs HBT, or an InP HBT. Other devices also may include a III-V transistor, an inductor, a capacitor, a varactor, a resistor, a diode, or a transformer. An IC interconnect can be low resistance electrical routing or wires created in a semiconductor process using a metal layer or a low resistance poly-silicon routing. A metal layer typically can be formed with one or more of an aluminum, a copper layer, or other metals, or alloys of Al and Cu or other metals, deposited on top of the silicon wafer material. Multiple metal layers can be formed, separated by insulating dielectric material such as an oxide or a nitride. A physical process parameter can include, without limitation, an oxide thickness, any critical dimension (CD) which controls differences between drawn and actual fabricated dimensions, a junction depth, an implant doping concentration, a salicide thickness, a silicide thickness, a metal concentration, or a metal thickness. An IC element geometry parameter can include, without limitation, a length, a width, an area, a perimeter, a multiplicity, a turn, a radius, a diameter, a spacing, a finger configuration, a segment configuration, a column configuration, or a row configuration.

Currently, a Split Condition may be created in a fabrication facility by generating a process recipe that produces the desired process parameter perturbations. In accordance with the embodiments herein, at least one Split Condition can be emulated so that an IC element performance characteristic can be determined prior to physical fabrication of the IC element.

FIG. 2 depicts a logical structure corresponding to a Split Conditions Table, or simply, Split Table 200. In general, Split Table 200 indicates the allowable process parameter perturbations, which can be combined to produce a selected Split Condition. Split Table 200 is formed of selected Split Conditions, such as selected Split Condition 250, which may be arranged as a matrix. Horizontal matrix rows describe selected Split Lots, such as Split Lot #1 (Split 1) 210, in Split Table 200, and vertical matrix columns describe selected Split Parameters 225, such as Gate Oxide Thickness (TOX) parameter 230. Split Parameters (SP) 225 can describe the physical process parameters which may be perturbed through fabrication process recipe changes. Each of the Split Parameters 230 also can be described by one or more split parameter levels. In the example Split Table 200, each of the Split Parameters 225 are described by three (3) split parameter levels such as parameter levels 235, 240, 245. Parameter level 235 may be designated as "H" or high level; parameter level 240 may be designated as "N" or nominal level; and parameter level 245 may be designated as "L" or low level. High, nominal, and low levels can be relative levels within the context of the corresponding Split Parameter 225.

One example of the relative levels of H, N, or L can be illustrated by TOX parameter 230, in which Split #1 is designated to receive a normal level of gate oxide thickness, as indicated by selected Split Condition 250. Process split parameter (TOX) 230 can represent the thickness of a gate oxide layer, as measured in metric distance (meters). An example thickness is 40 e-10 meters (4 nm). In the present example, allowable perturbations can be H, N, or L, with N being a standard, or nominal, parameter setting, such as 40 e-10 m. Also, the H (or high) setting of TOX 230 may correspond to 41 e-10 m (4.1 nm) and the L (or low) setting may correspond to 39 e-10 m (3.9 nm). In the present example, a particular portion of the semiconductor process recipe, such as TOX deposition time, may be modified to achieve different gate oxide thickness perturbations, as would be understood by a skilled artisan. Of course, other portions of a fabrication process recipe may be modified, including, without limitation, include one or more of a deposition time, an implant energy, an implant dosage, a temperature, a temperature gradient, a pressure, a pressure gradient, a concentration, a concentration gradients or other recipe steps that can, individually or in combination, alter device performance characteristic. Typically, the total allowable Split Conditions can be identified by $N^{SP}$. For example, FIG. 2 describes six (6) Split Parameters, each with three (3) Split Parameter Levels, such that a total of 729 Split Conditions can be created, that is $N^{SP}=729$.

Figure 3:
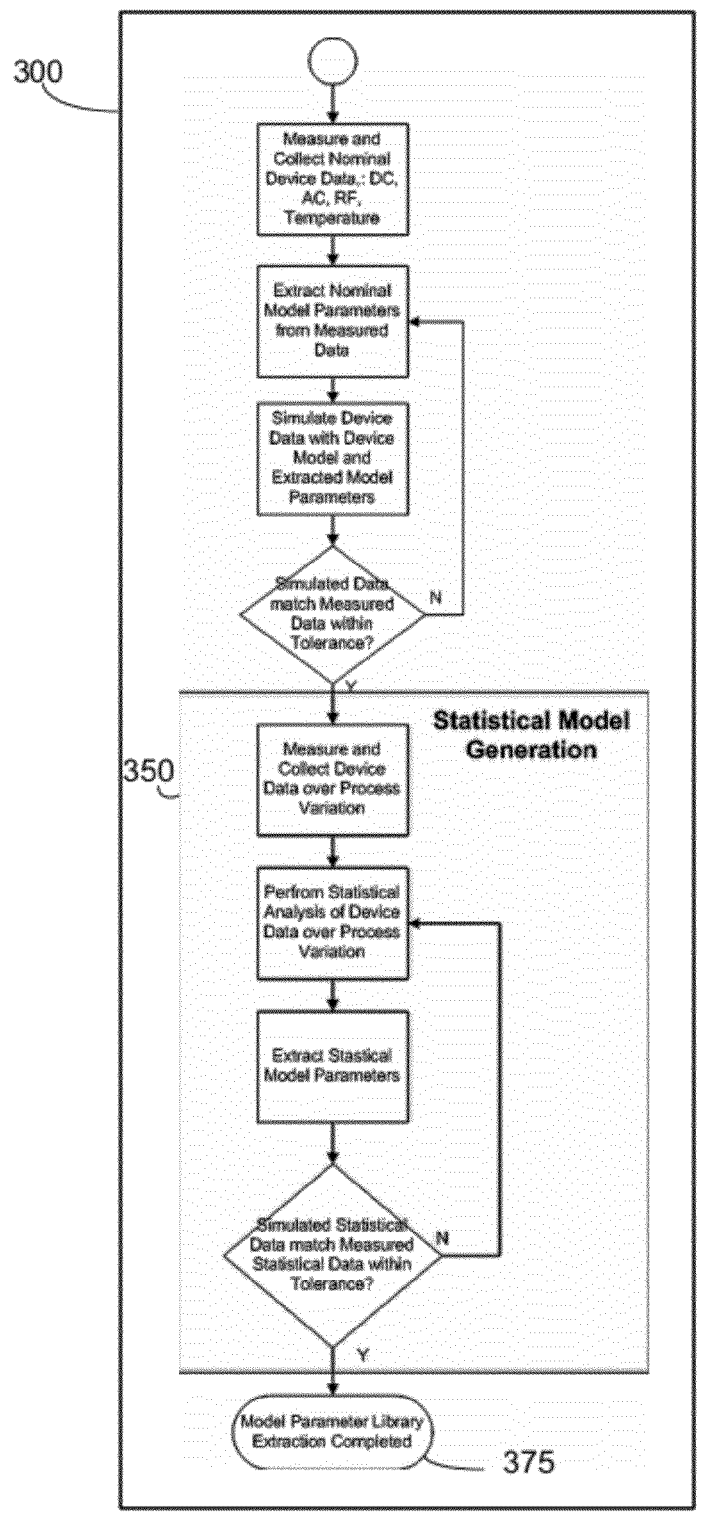
FIG. 3 is an illustrative flow diagram of a Model Parameter Library Extraction, which may be used in conjunction with a predictive Model Parameter Library embodiment development, in accordance with the teachings of the present invention.

FIG. 3 shows a standard Model Parameter Library Extraction flow 300 commonly used in the semiconductor industry to extract model parameters for device models in SPICE circuit simulators. Model Parameter Library extraction flow 300 can be used to develop a predictive Model Parameter Library, such as MPL 160, in FIG. 1. Typically, the fidelity of an IC simulation to measured results can be correlated to the accuracy of the device simulation data, relative to the measured data. The accuracy tolerance of the device level simulation may be a subjective number based on the particular requirements provided by a model extraction engineer or the enterprise where the model extraction is performed or both. In general, physically-based device models used in conjunction with model parameter extraction can enable the highest attainable simulation-to-measured device accuracy. Physically-based models rely on model parameters that correspond primarily to physical process and geometry parameters. Empirical "fitting" parameters devoid of physical basis may be used to a lesser extent.

A statistical model can be provided 350 for a selected semiconductor process. A typical corner or statistical model for an IC element may include a global, a local, or a spatial variation, which may perturb a performance characteristic of an IC element with respect to a selected nominal value. The accuracy and robustness of a statistical model can have an impact on the accuracy and robustness of other models and determinations in which the statistical model is used. A statistical model may be generated by one of numerous statistical model generation techniques, with model accuracy being related to the technique employed.

An example of a suitable statistical model generation techniques, which may be used for embodiments herein, can be a variation modeling technique, which can include, without limitation, a back-ward propagation of variance (BPV) technique, a forward propagation of variation (FPV) technique, a combined BPV and FPV technique, or a principle component analysis-type technique. However, it is to be understood that embodiments of the present invention are not limited to a statistical model generated by any of the aforementioned techniques. Indeed, embodiments of the present invention may be used with statistical models generated from nearly any statistical model generation method. Variation modeling based on physical process and geometrical parameter variations can permit isolation and inclusion of global and local mismatch variations in an IC element model, as well as identification of a hidden device-to-device correlation. In accordance with the teachings of the embodiments herein, predictive split lot emulation may be substituted, for example, at S375, such that standard Model Parameter Library Extraction flow 300 can be transformed into a predictive Model Parameter Library Extraction flow. Of course, other configurations are possible.

In accordance with the embodiments herein, a predictive Split Lot Emulator, such as SLE 110 in FIG. 1, can be used to generate predictive statistical model parameters, either directly or indirectly, through selected mapping equations. An example of mapping a split parameter into statistical model parameters for a polysilicon resistor can be described by Equation (1) provides an example device model equation for resistance of a polysilicon resistor.

$$R_{poly} = \rho_{poly} \times \frac{L}{W - DW} + \frac{R_{end}}{W - DW} \quad (1)$$

Table 1 below provides a description of the model parameters of equation (1):

| Device Model Parameter | Description |
| --- | --- |
| $\rho_{poly}$ (rho) | Poly-silicon sheet resistance |
| L | Drawn Length of resistor |
| W | Drawn Width of resistor |
| DW | Difference in drawn and actual width of resistor |
| $R_{end}$ | Fixed resistance at end of resistor |

From FIG. 2, examples of Split Parameters which may influence a poly-silicon resistor are the poly-silicon critical dimension, $CD_{POLY}$, and poly-silicon doping, $N_{POLY}$. An example of equation mapping in accordance with embodiments herein can include the mapping of the split parameter $N_{POLY}$ into the model parameter $\rho_{poly}$, as may be described by Equation (2):

$$\rho_{poly} = \frac{1}{q \times t_{poly} \times (\mu_{poly} \times N_{poly})} \quad (2)$$

where q represents Coulomb charge constant, namely 1.602 e-19 Coulombs, $t_{poly}$ represents the thickness poly-silicon layer, and $\mu_{poly}$ represents the mobility of a charge in the poly-silicon layer which can be dependent on $N_{POLY}$. In addition, Equation (3) can provide mapping of the split parameter $CD_{poly}$ into the model parameter DW.

$$DW = -1 \times CD_{poly} \quad (3)$$

Split Parameter perturbations can be represented by deltas or $\Delta SP$, with the absolute value typically being determined by the particular semiconductor process in the particular fabrication facility. Equations (2) and (3) represent the nominal or (N) condition as shown in the split table where the split parameter perturbations are zero, or $\Delta SP=0$. The general forms of equations (2) and (3) to account for the split condition perturbations are given by equations (4) and (5):

$$\rho_{poly} = \frac{1}{q \times t_{poly} \times (\mu_{poly} \times [N_{poly} \times (1 + \Delta N_{poly})])} \quad (4)$$

$$DW = -1 \times (CD_{poly} + \Delta CD_{poly}) \quad (5)$$

where $\Delta N_{poly}$ is given in relative terms and $\Delta CD$ is given in absolute terms.

An example of split parameter mapping into statistical model parameters for the threshold voltage on a MOSFET transistor is given as follows. Equation (1) provides an example device model equation for threshold voltage of a MOSFET:

$$V_T = VFB + 2\phi_F + \gamma\sqrt{2\phi_F} \quad (6)$$

where VFB is the flatband voltage, $\phi_F$ is the Fermi potential, and the body factor $\gamma$ is given by $$\gamma = \frac{TOX}{\varepsilon_{OX}} \sqrt{2q\varepsilon_{SI} N_{NFET}} \quad (7)$$

where $\varepsilon_{OX}$ and $\varepsilon_{SI}$ are the permittivities of oxide and silicon, respectively. Split Parameters TOX 230 and $N_{NFET}$ 255 in Table 200 of FIG. 2 can be directly mapped into threshold voltage equation (6) using equation (7). VFB and $\phi_F$ can be logarithmically dependent on $N_{NFET}$. Equation (7) can represent the nominal, or (N), in Split Table 200, where Split Parameter Perturbations are essentially zero, i.e., $\Delta SP=0$. A general form of Equation (7), which can account for split condition perturbations can be described by Equation (8):

$$\gamma = \frac{TOX + \Delta TOX}{\varepsilon_{OX}} \sqrt{2q\varepsilon_{SI}[N_{NFET}(1 + \Delta N_{NFET})]} \quad (8)$$

where $\Delta N_{NFET}$ is given in relative terms and $\Delta TOX$ is given in absolute terms.

Example split parameter perturbations are described in TABLE 2:

TABLE 2

| Split parameter | H | N | L |
|---|---|---|---|
| $\Delta N_{POLY}$ | 10% | 0 | −10% |
| $\Delta CD_{POLY}$ | 1 e-8 meters | 0 | −1 e-8 meters |
| $\Delta N_{NFET}$ | 10% | 0 | −10% |
| $\Delta T_{ox}$ | 1 e-10 meters | 0 | −1 e-10 meters |

Figure 4:
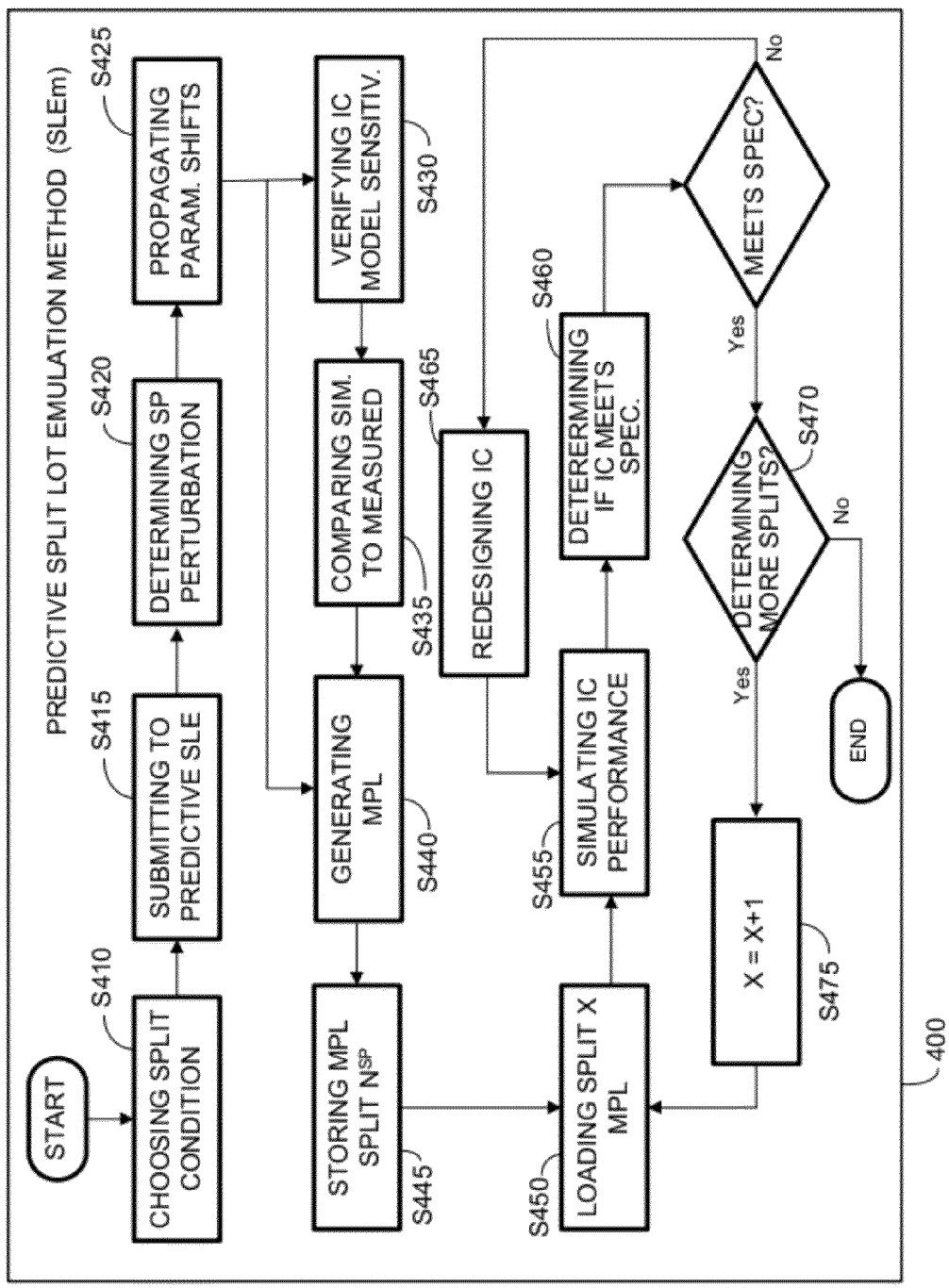
FIG. 4 is an illustrative flow diagram of a Split Lot Emulation process, in accordance with the teachings of the present invention.

FIG. 4 illustrates one possible flow scheme for a Split Lot Emulator method (SLEm) 400 in accordance with the embodiments herein. Where appropriate, reference is made to analogous elements of FIGS. 1 and 2, by corresponding reference number.

In SLEm 400, choosing (S410) from Split Table, a selected Split Condition, referred to as Split X, may be performed an IC Designer or by an executing program of a predictive split lot analyzer, for example, Split Lot Analyzer 100. An example Split Table, such as Split Table 200, may be provided by the fabrication facility 190. Also, submitting (S415) selected Split X values to a predictive emulator, such as SLE 110, may be performed an IC Designer or by an executing program of the predictive split lot analyzer. Determining (S420) selected Split X split parameter perturbations, $\Delta SP$, as given in the Split Table, is performed by the predictive split lot emulator, which then effects propagating (S425) parameter shifts into selected model parameters. Propagating (S425) may be performed through mapping equations, and may be direct propagation or indirect propagation. In some embodiments, propagating (S425) parameter shifts into selected model parameters can be a qualified, validated, verified, or well-characterized transformation of the selected model parameters, and additional verification or validation of selected IC element model sensitivities to the Split X split parameter perturbations may be unnecessary. In this instance, the action of propagating (S425) may be followed by generating (S440).

On the other hand, if qualification, or validation, or verification, or characterization of the transformation of the selected model parameters by the parameter shifts is indicated, the predictive split lot emulator method 400 may continue by verifying (S430) a selected IC element model sensitivity to Split X SP perturbations. The predictive emulator performs comparing (S435) one or more simulated electrical performance parameters matched to actual measurements of Split X for a selected IC element model, and, if the simulated results and the measured results compare favorably, generating (S440) a selected Model Parameter Library, including a parameter for the selected IC element model. By storing (S445) selected Split X Model Parameter Library file in a memory, such as memory 134, where the Library file may be reviewed by an IC designer.

Loading (S450) Split X Model Parameter Library into a design environment may be performed by an IC designer directly, or indirectly using, for example, the predictive split lot analyzer. The predictive split lot analyzer may be coupled a computer aided design simulator, for example CADS 125. In an example embodiment, the Model Parameter Library may be automatically input into a PDK design environment coupled to the predictive split lot analyzer, for example, PDK 130. SLEm 400 can continue by simulating (S455) a selected IC element performance characteristic with a selected split parameter from the Split X Model Parameter Library, for example, using the computer aided design simulator. Simulating (S455) can be done within the PDK environment. Alternatively, simulating (S455) can be done apart from the PDK environment. Determining (S460) by the split lot analyzer whether CAD simulation results at Split X signify that the selected IC element performance characteristic does not meet a performance requirement or a specification or a figure-of-merit, redesigning (S465) the selected IC element may be performed and SLEm 400 may be resumed with simulating (S455). However, if the CAD simulation results at selected Split X signify that the selected IC element performance characteristic does meet a selected performance requirement or a selected specification or a selected figure-of-merit, SLEm 400 may continue by determining (S470) whether additional selected split conditions are available for processing.

If determining (S470) indicates that additional selected split conditions are available for processing, choosing (S410) an additional selected Split condition (S475), here referred to as Split X+1, is executed and SLEm 400 continues therefrom. If no additional selected split conditions are available for processing, then SLEm 400 may terminate. SLEm 400 also may be run in a batch mode, where multiple split conditions (Split X, Split X+1, Split X+2 ... up to Split $N^{SP}$) may be processed simultaneously, or in parallel. In an example embodiment, method elements are executed through a World Wide Web page interface on a website.

Figure 5:
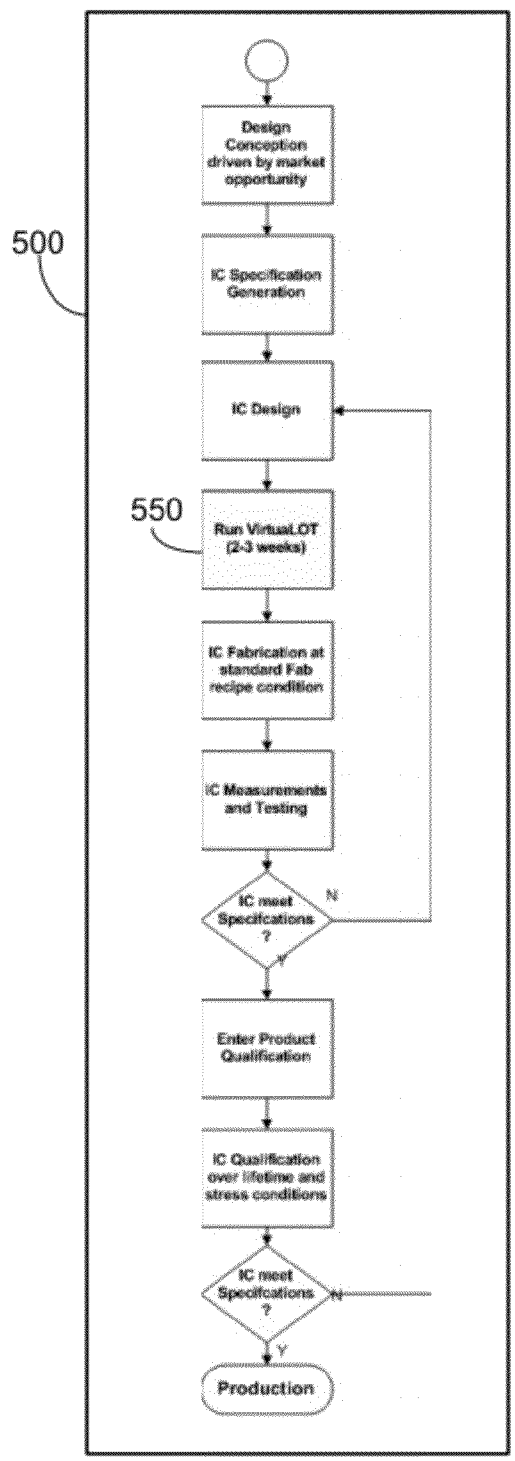
FIG. 5 is an illustrative flow diagram of an embodiment of a selected IC production process employing predictive split lot emulation method, in accordance with the teachings of the present invention.

FIG. 5 illustrates an example embodiment of a selected IC production process 500, where a physical manufacturing-based Split Lot process is replaced by a predictive split lot emulation process 550, such as SLEm 400 in FIG. 4. The predictive split lot emulation process can be performed in a CAD environment, prior to an IC fabrication at a standard process recipe condition. Presently, a physical manufacturing-based Split Lot process consumes from about 13 weeks to about 16 weeks. In contrast, a predictive split lot emulation process embodiment according to the teachings herein, the virtual Split Lot process may consume from about 2 weeks to about 3 weeks. Thus, it may be possible to reduce processing time for split lot processing up to 14 weeks, a substantial improvement considering design-to-market time may play a direct role in determining the market share of an IC manufacturer.

A verification of a Split Lot Emulator, such as SLE 110 in FIG. 1, or a Split Lot Emulation method, such as SLEm 400 in FIG. 4, may be accomplished by comparison of simulated parameters and measured Wafer Acceptance Test (WAT) parameters of an exhaustive set of Split Lot wafers. WAT parameters also may be referred to as Process Monitor Control (PCM) parameters. Typically, once wafers finish fabrication, WAT parameters may be measured on at least one location on wafers manufactured in a fabrication facility using automated test equipment, for example, metrology system 185 in FIG. 1, located inside the manufacturing facility 190.

FIG. 6 shows an example wafer 600 where WAT tests are performed at five (5) locations, collectively represented by reference 605, and measured WAT parameters are collected. A WAT parameter can include various electrical performance characteristics for each IC element in a semiconductor process. In FIG. 6, example measured WAT parameters 630 are saturation drain currents for N- and P-MOSFET transistors, respectively, IDSATN and IDSATP; threshold voltage for N- and P-MOSFET transistors, respectively, VTN and VTP; and poly silicon sheet resistance.

Other WAT parameters may include, without limitation, one or more of a FET transconductance; a FET output conductance; a FET current; a FET threshold voltage; a FET effective width; a FET effective length; a BJT beta; a BJT current; a BJT conductance; a BJT transconductance; a capacitance of an IC element; a current of an IC element; a voltage of an IC element; a conductance of an IC element; a transconductance of an IC element; a voltage coefficient of an IC element or an IC element layer; a resistance of an IC element or an IC element layer; sheet resistance of an IC element; sheet resistance of a semiconductor, a salicide, a silicide or a metal layer; a resistor end resistance; a thickness of a semiconductor, a salicide, a silicide, a metal layer, an oxide layer, a nitride layer, a thin film layer, or an inter-layer dielectric (ILD); a varactor tuning; a varactor tuning range; a varactor quality factor; an inductance of an IC element or an IC element layer an inductor quality factor; a maximum cut-off frequency (Fr) of an IC element; maximum operating frequency of an IC element ($f_{max}$); an IC element gain; an s-parameter of an IC element; a y-parameter of an IC element; an h-parameter of an IC element; or noise of an IC element.

Verification of predictive split lot emulation can involve a selected IC element model simulation of corresponding WAT parameters of a nominal process condition, for example, where all ΔSP=0. Also, the selected IC element model simulation can match the measured nominal process condition as given by the nominal process condition measured WAT parameters, referred to as the Nominal Split in FIG. 6. If the error tolerance is about 1%, for example, then FIG. 6 indicates that the nominal IC element model verification can be satisfied.

An exhaustive set of Split Conditions may be conducted. FIG. 6 also illustrates an example verification result 650 for the Split X condition. Measured WAT parameters can be tabulated for the five (5) WAT sites for the wafer run under Split X condition. The average value for each WAT parameter can be calculated. Simulation of the WAT parameters of the predictive split lot emulator or the predictive split lot emulator method can be performed at Split X, where all ΔSP values may be set to the Split X ΔSP values. An average of the measured WAT parameters can be compared to the simulation of the WAT parameters by predictive split lot emulation, and the error can be calculated. If the error tolerance is about 1% for example, then FIG. 6 shows that the predictive split lot emulator verification for Split X is satisfied. Split X verification procedure then can be repeated for more splits where the maximum amount of Split Conditions that can be verified is $N^{SP}$.

Another, although more time-consuming, method of predictive split lot emulator verification can begin with extensive measurements of IC element characteristics which may include, without limitation, one or more of a full sweeps of a DC, an AC, an IV, a CV, an RF, or a thermal measurement on one or more selected IC element geometries, and may include one or more measurements for each selected IC element in the selected semiconductor process. The measurements may be performed on test devices included in the WAT sites, or on dedicated test devices which may be included on a dedicated test wafer, or as part of an IC.

Statistical analysis of the error results across multiple WAT sites on multiple Split Conditions can be collected and used as a diagnostic tool to improve the verification process and improve the accuracy of a predictive Split Lot Emulator or a predictive Split Lot Emulator process. Based upon present day semiconductor manufacturing process technology, an embodiment of a predictive Split Lot Emulator successfully simulated Split Lot conditions within about 1% accuracy between measured and simulated conditions.

Although the present invention has been described by way of example with references to the drawings, it is to be noted herein that various changes and modifications will be apparent to those skilled in the art. Therefore, unless such changes and modifications depart from the scope of the present invention, they should be construed as being included therein.

What is claimed is:

1. A method of simulating integrated circuit performance characteristic variations, comprising: choosing a selected Split Condition from a Split Table;
   receiving the selected Split Condition by a Predictive split lot Emulator;
   determining a selected Split Parameter Condition Perturbation from the selected Split Condition by the Predictive split lot Emulator;
   mapping the selected Split Parameter Condition Perturbation into a selected Model Parameter Perturbation corresponding to a selected IC element,
      wherein determining and mapping are executed prior to integrated circuit fabrication; and
   storing the selected Model Parameter Perturbation into a Model Parameter Perturbation Library corresponding to the selected IC element,
   wherein the selected Model Parameter Perturbations Library emulates the selected IC element performance characteristic corresponding to the selected Split Condition.

2. The method of claim 1, further comprising:

storing the selected Model Parameter Perturbation Library in a storage memory of a programmed computer;

loading the selected Model Parameter Perturbation Library from the storage memory into a Predictive split lot Analyzer in the programmed computer;

selecting the selected Model Parameter Perturbation from the selected Model Parameter Perturbation Library;

simulating a performance characteristic of the IC selected element using the selected Model Parameter Perturbation in a computer aided design simulator (CADS), from the selected Model Parameter Perturbation Library, wherein the simulating produces simulation results corresponding to the performance characteristic of the IC selected element with respect to the selected Split Condition;

determining from simulation results if the selected IC element meets a predetermined metric for the selected Split Condition;

if the selected IC element does not meet the predetermined metric, then modifying a designed portion of the selected IC element and resuming the method at simulating;

if the selected IC element does meet the predetermined metric, then determining if an additional selected Model Parameter Perturbation is to be simulated for the selected IC element; and if the additional selected Model Parameter Perturbation is to be simulated for the selected IC element, then selecting the additional selected Model Parameter Perturbation from the selected Model Parameter Perturbation Library and resuming the method by simulating, using the additional selected Model Parameter Perturbation.

3. The method of claim 2, further comprising:

selecting plural selected Model Parameter Perturbations from the selected Model Parameter Perturbation Library for simulation of corresponding performance characteristics of the selected IC element; and simulating two or more of the plural selected Model Parameter Perturbations in parallel in a computer aided design simulator.

4. The method of claim 2, further comprising:

providing the Split Table by a fabrication facility, wherein the Split Table stores at least one selected split parameter perturbation.

5. The method of claim 2, wherein the selected IC element is one of a device or an interconnect.

6. The method of claim 2, wherein the Predictive split lot Analyzer is a constituent of a computer aided design simulator.

7. The method of claim 2, wherein the predetermined metric is one of a predetermined performance requirement or a predetermined specification or a predetermined figure-of-merit for the selected IC element.

8. The method of claim 2, wherein the Predictive split lot Analyzer is a constituent of a process development kit design environment, and further comprising:

inputting the selected Model Parameter Perturbation Library into the process development kit design environment.

9. The method of claim 8, wherein simulating is within the process development kit design environment and the process development kit design environment is a constituent of the computer aided design simulator.

10. The method of claim 2, further comprising:

determining a simulation result with the predictive split lot emulator;

fabricating at least one IC wafer having a selected IC element thereon;

measuring a Wafer Acceptance Test parameter on the at least one IC wafer corresponding to the simulation result; and comparing the simulation result to the Wafer Acceptance Test parameter by which accuracy of the predictive split lot emulator is verified.

* * * * *